United States Patent [19]

Khouri

[11] Patent Number: 5,567,780

[45] Date of Patent: Oct. 22, 1996

[54] IMPACT MODIFIED POLYPHENYLENE ETHER BLENDS

[75] Inventor: Farid F. Khouri, Clifton Park, N.Y.

[73] Assignee: General Electric Company, Schenectady, N.Y.

[21] Appl. No.: 522,203

[22] Filed: Aug. 31, 1995

[51] Int. Cl.$^6$ ..................... C08G 65/48
[52] U.S. Cl. .............. 525/394; 525/391; 525/397
[58] Field of Search ................. 525/391, 397, 525/394

[56] References Cited

U.S. PATENT DOCUMENTS

| | | | |
|---|---|---|---|
| 5,115,042 | 5/1992 | Khouri et al. | 525/397 |
| 5,153,290 | 10/1992 | Khouri et al. | 526/266 |
| 5,162,448 | 11/1992 | Khouri et al. | 525/390 |
| 5,171,866 | 12/1992 | Khouri | 548/449 |
| 5,212,255 | 5/1993 | Khouri et al. | 525/391 |
| 5,247,006 | 9/1993 | Khouri et al. | 524/508 |

*Primary Examiner*—Edward J. Cain
*Attorney, Agent, or Firm*—William H. Pittman

[57] ABSTRACT

Impact modified polyphenylene ether blends are described and the blends comprise orthoester functionalized polyphenylene ethers and orthoester functionalized rubbers, and polyesters.

17 Claims, No Drawings

IMPACT MODIFIED POLYPHENYLENE ETHER BLENDS

FIELD OF THE INVENTION

The instant invention is directed to impact modified blends. More particularly, the invention is directed to polyphenylene ether blends comprising functionalized rubbers and the blends unexpectedly display improved impact properties.

1. Background of the Invention

Polyphenylene ethers are a widely used class of thermoplastic engineering resins characterized by excellent hydrolytic stability, dimensional stability, toughness, heat resistance and dielectric properties. They are, however, deficient in certain other properties including workability and solvent resistance. Therefore, there is a continuing search for means for modifying polyphenylene ethers to improve these other properties.

Among the means being studied are blending of polyphenylene ethers with certain other resinous materials including polyesters. Nevertheless, molded parts fabricated from such blends are generally brittle and may undergo catastrophic delamination and/or phase separation.

It is of increasing interest, therefore, to prepare polyphenylene ether blends that are not brittle after molding.

2. Description of the Prior Art

Efforts have been described for producing polyphenylene ether copolymers. In U.S. Pat. No. 5,162,448, orthoester capped polyphenylene ethers are prepared from chlorotriazine containing orthoester substituents and the capped polyphenylene ethers are reacted with carboxylic acid functionalized polyesters.

Other efforts have been described for producing polyphenylene ether graft orthoester copolymer blends. In U.S. Pat. No. 5,247,006, the reaction product of orthoester functionalized polyphenylene ethers and nucleophilic polymers are described.

SUMMARY OF THE INVENTION

In a first aspect, the instant invention is directed to a process for making polyphenylene ether blends comprising the step of compounding:

(a) functionalized polyphenylene ethers;
(b) functionalized rubbers; and
(c) polyesters.

In a second aspect, the instant invention is directed to a process for making polyphenylene ether blends comprising the step of compounding:

(a) functionalized polyphenylene ethers; and
(b) mixtures comprising polyesters, functionalized rubbers and copolymers prepared therefrom.

In a third aspect, the instant invention is directed to a process for making polyphenylene ether blends comprising the steps of:

(a) simultaneously functionalizing polyphenylene ethers and rubbers; and
(b) compounding the reaction products in (a) with polyesters.

In a fourth aspect, the instant invention is directed to the product of the processes in the first three aspects of this invention. Said product is a polyphenylene ether blend composition comprising the reaction product of (a) functionalized polyphenylene ethers; and
(b) at least one group selected from the groups consisting of:
   (i) polyesters and functionalized rubbers, and
   (ii) mixtures comprising polyesters, functionalized rubbers and copolymers prepared therefrom.

DETAILED DESCRIPTION OF THE PREFERRED EMBODIMENTS

The polyphenylene ethers which may be employed in the instant invention are typically prepared by the oxidative coupling of at least one monohydroxyaromatic compound such as 2,6-xylenol or 2,3,6-trimethylphenol. Catalyst systems are generally employed for such coupling; they typically contain at least one transition metal compound such as a copper, manganese or cobalt compound, usually in combination with various other materials.

Furthermore, polyphenylene ethers suitable for use in the practice of the present invention may be prepared by any of a number of processes utilizing precursor corresponding phenols or derivatives thereof. Examples for their production are disclosed in U.S. Pat. Nos. 3,306,874; 3,306,875; 3,257,357; 3,257,358; 3,337,501; and 3,787,361, all incorporated herein by reference.

Among the useful polyphenylene ethers are those which comprise molecules having at least one aminoalkyl-containing end group. The aminoalkyl radical is typically located in an ortho position to the hydroxy group. Products containing such end groups may be obtained by incorporating an appropriate amine such as di-n-butylamine or dimethylamine as one of the constituents of the oxidative coupling reaction mixture. Also frequently present are 4-hydroxybiphenyl end groups, typically obtained from reaction mixtures in which a by-product diphenoquinone is present, especially in a copper-halide-secondary or tertiary amine system. A proportion of the polymer molecules may contain at least one of said aminoalkyl-containing and 4-hydroxybiphenyl end groups.

An example of the overall equation for the production of polyphenylene ethers which are often employed in this invention may be summarized as follows:

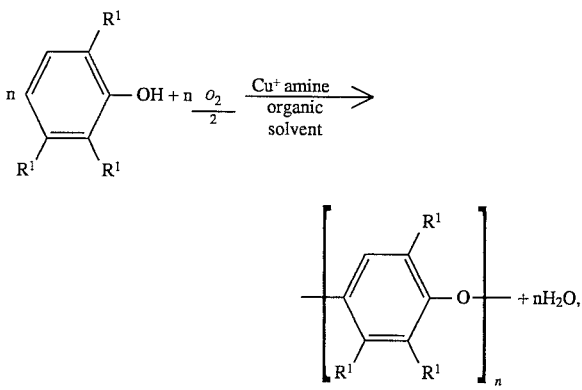

wherein each $R^1$ is independently a hydrogen, $C_{1-10}$ alkyl group and preferably a methyl group, an aromatic group, a halohydrocarbon group, a hydrocarbonoxy group or a halohydrocarbonoxy group and n is a positive integer usually greater than 5.

The rubbers which may be employed in this invention are not limited and may include any of the olefin polymers which may be orthoester functionalized in accordance with this invention.

The preferred rubbers that may be employed in this invention include unsubstituted and substituted copolymers comprising ethylene and propylene structural units. Other preferred rubbers which may be employed include ethylene alkene rubbers such as poly(ethylene-copropylene), polydiene rubbers such as polybutadiene, and polyacrylates such as poly(butylacrylate). The most preferred rubbers which may be employed in this invention include, for instance, ethylene propylene diene comonomer (EPDM) rubbers and derivatives thereof.

The polyesters which may be employed in this invention are not limited and often include poly(alkylene dicarboxylates) polymers comprising structural units of the formula

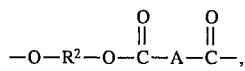

wherein $R^2$ is an alkylene or mono- or polyoxyalkylene radical containing a straight chain of about 2–8 atoms and A is a m- or p-linked aromatic or alicyclic radical. Hence, it is preferred that the polyesters are of the family consisting of polymeric glycol terephthalates and isophthalates and mixtures thereof including copolyesters of terephthalic and isophthalic acids. Especially preferred polyesters employed in the instant invention are poly(1,2-ethylene 2,6-naphthalene dicarboxylate) (PEN), poly(ethylene terephthalate) (PET) and poly(1,4-butylene terephthalate) (PBT) polymers and copolyesters comprising structured units of the same.

The polyesters may be prepared by methods known in the art such as those which comprise contacting at least one diol of the formula HO—$R^2$—OH and at least one diacid chloride of the formula

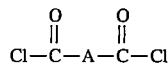

under substantially anhydrous conditions and in the presence of a substantially water immiscible organic solvent, with at least one unhindered tertiary amine; said contact being conducted at a temperature from about −25° C. to about +25° C.

Other methods for preparing polyesters which may be employed in this invention include reacting alkanediols and dicarboxylic esters in the presence of a titanium containing catalyst such as a tetraalkyl titanate. A more detailed description of the polyesters which may be employed in this invention is described in U.S. Pat. No. 4,452,933, the disclosure of which is incorporated herein by reference.

The type of functionalization of the polyphenylene ethers and rubbers employed in this invention is limited only to the extent that a polyphenylene ether blend is capable of being formed.

The preferred functionalization of the polyphenylene ethers and rubbers includes functionalization with at least one functional moiety selected from the group consisting of orthoesters and orthocarbonates.

The functionalization may be achieved, for example, by first preparing an ethylenically unsaturated cyclic orthoester by reacting a hydroxy-substituted cyclic orthoester like 4-hydroxymethyl- 2-methoxy-2-methyl-1,3-dioxolane with acryloyl chloride, methacryloyl chloride, vinylbenzyl chloride or the like. A further explanation of such preparation is disclosed in U.S. Pat. No. 5,171,866, the disclosure of which is incorporated herein by reference.

Subsequent to the formation of the ethylenically unsaturated cyclic orthoesters, said ethylenically unsaturated cyclic orthoester may be employed to functionalize the polyphenylene ethers and rubbers by any conventional method including compounding in an extruder, each independently or simultaneously.

After the functionalized polyphenylene ethers and rubbers are formed, they may be further compounded in an extruder with the polyesters. As set forth in the first three aspects of this invention, once the polyphenylene ethers and rubbers are functionalized (simultaneous or not) both may be compounded with the polyesters. Further, mixtures comprising copolymers may first be prepared by compounding functionalized rubbers with polyesters followed by compounding with functionalized polyphenylene ethers.

The preferred functional moieties selected from the group consisting of orthoesters and orthocarbonates in their ethylenically unsaturated form are represented by structural units having the formula

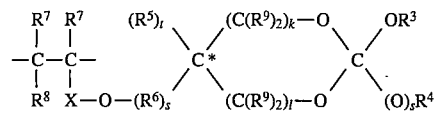

wherein $R^3$ is a $C_{1-10}$ primary or secondary alkyl or aralkyl or a $C_{6-10}$ aromatic radical or an alkylene radical forming a second 4 to 8 membered ring with C* thus producing a bicyclo compound. $R^4$ is a $C_{1-10}$ primary or secondary alkyl or aralkyl or a $C_{6-10}$ aromatic radical or $R^3$ and $R^4$ taken together with atoms connecting them can form a 4 to 8 membered ring thus producing a spirocyclo compound. $R^5$ is a hydrogen, alkyl or aryl and $R^6$ is a $C_{1-6}$ alkylene radical. k is an integer from 0 to 2 and I is an integer from 0 to 1. s is 0 or 1 and t is 0 when $R^3$ and C* form a bicyclo compound and is otherwise 1. Each $R^7$ is individually a hydrogen or methyl. $R^8$ is hydrogen, $C_{1-6}$ alkyl group or a $C_{6-10}$ aromatic radical. Each $R^9$ is independently a hydrogen, $C_{1-5}$ hydrocarbon, substituted or unsubstituted aromatic radical or a halogen. X is a substantially inert linking group such as substituted or unsubstituted divalent aliphatic, alicyclic or aromatic radicals, wherein the radicals may be attached to other divalent radicals like carbonyl, sulfone and carbamoyl radicals.

The product, a composition, produced via the process of the instant invention is superior and unexpected.

Said composition comprises:

(a) a polyester matrix;

(b) polyphenylene ethers and functionalized rubbers dispersed only in said polyester matrix, and not each other and said functionalized rubbers are often less than about 30 microns in size and preferably less than about 20 microns in size and most preferably less than about 10 microns in size.

Moreover, there is no limitation with respect to the amount of polyesters, polyphenylene ethers and functionalized rubbers present in the compositions. Often, however, the compositions are no more than about 75% polyester, no more than about 50% polyphenylene ether and no more than about 25% functionalized rubber based on total weight of the composition.

It is further within the scope of the instant invention to employ any additives/fillers that are typically used in compositions such as those described in this invention. Such additives/fillers include, for instance, glass fibers, ultraviolet light screeners and thermal stabilizers. Additionally, when preparing the instant compositions, initiators and lubricants may be employed but are not required.

The following examples further illustrate and facilitate an understanding of the instant invention. The compositions obtained may be confirmed by conventional techniques such as proton and carbon-13 nuclear magnetic resonance spectroscopy, infrared spectroscopy and GPC analysis.

EXAMPLE 1

A 5-liter 3-necked flask fitted with a mechanical stirrer, pressure equalizing addition funnel and nitrogen inlet was charged with 301 grams (2.03 moles) of 4-hydroxymethyl-2-methoxy-2-methyl- 1,3-dioxolane, 514 grams (5.08 moles) of triethylamine and 2 liters of methylene chloride. The flask was immersed in an ice-water bath and 193.1 grams (2.13 moles) of acryloyl chloride was added over 50 minutes under nitrogen, with stirring. The mixture wa stirred at room temperature overnight and the filtrate was washed twice with 2-liter portions of water, dried over magnesium sulfate, filtered and vacuum stripped. A free radical inhibitor, 3-t-butyl-4-hydroxy-5-methylphenyl sulfide, was added in the amount of 200 ppm to the residue which was then distilled under vacuum. The desired 4-acryloyloxymethyl-2-methoxy-2-methyl-1,3-dioxolane (ethylenically unsaturated cyclic orthoester) distilled at 80°–85° C./0.5–1.0 torr was obtained.

EXAMPLE 2

A twin screw extruder was charged with 250 g of polyphenylene ether resin, (2,6-dimethyl- 1,4-polyphenylene ether) intrinsic viscosity of 0.41 in chloroform at 25° C., 3.75 g acrylate orthoester as prepared in Example 1 (1.5 wt %), 0.5 g of a 2,5-dimethyl-2,5-d(t-butylperoxy)hexyne-3 initiator (0.02 wt %) and 7.5 g of commercially available polyalpha-olefin as a lubricant (3.0 wt %) producing a mixture. The mixture was subsequently blended in the twin screw extruder at a screw speed of 360 rpm with a feed rate maintaining the torque between 5–6 amp. Barrel temperatures were as follows: zone 1 equals 121° C., zone 2 equals 191° C. and zones 3–6 and the die temperature was 266° to 299° C. The extrudate formed was collected, pelletized and dried at 110° C. for 3 hours. The resulting extrudate, orthoester functionalized polyphenylene ether was collected, pelletized and dried at 110° C. for 3 hours.

EXAMPLE 3

10 g of acrylate orthoesters as prepared in Example 1 and 1 g of 2,5-dimethyl-2,5-di(t-butylperoxy)hexane were premixed and combined with 1 kilogram of a commercially available EPDM copolymer containing about 83 mole percent ethylene and about 5.4 mole percent norbornene units. The resulting mixture was stored for about 16 hours at 20° C. to enable the orthoester and polymerization initiator to be completely absorbed by the EPDM pellets. The contents were then extruded on a twin screw extruder with zone set temperatures ranging from 120° to 205° C. The resulting extrudate was cooled in a water bath, pelletized and dried in vacuum. Orthoester functionalized rubber was obtained.

EXAMPLE 4

Example 4 was conducted in a manner similar to the one described in Example 2 except that the extruder was charged with 3 parts by weight unfunctionalized polyphenylene ethers and 1 part by weight rubbers, and the functionalization of the polyphenylene ethers and rubbers took place simultaneously.

EXAMPLE 5

A composition having functionalized polyphenylene ethers, functionalized rubbers and polyesters was prepared a follows.

An extruder apparatus was charged with a mixture of 30 parts functionalized polyphenylene ethers as prepared in Example 2, 60 parts poly(1,4-butylene terephthalate) (Mw= 100,000 based on polystyrene standards) and 10 parts functionalized rubber as prepared in Example 3. The mixture was subsequently compounded at zone temperatures set at 121° C., 191° C., 4 at 266° C. and a die temperature of 268° C. The screw speed was set at 400 rpm. The resulting extrudate was pelletized and molded into injection parts in accordance with ASTM standards. The notched Izod measurement was 10.3 ft lb/in.

The data in the table below is provided to demonstrate the unexpected and superior properties obtained in the instant invention. All entries have been prepared in a manner similar to those described in the examples provided above. Entries 4–7 show that compounding with functionalized polyphenylene ethers and rubbers yields an unexpected and superior impact resistance.

TABLE

| Entry | Resin[c] | Rubber[d] | Impact Resistance (ft-lb/in)[e] |
|---|---|---|---|
| 1 | P | r | 1.10 |
| 2 | p | R | 0.30 |
| 3 | P | S | 3.20 |
| 4 | P | R | 11.7 |
| 5 | P | R* | 10.3 |
| 6[a] | P | R* | 10.4 |
| 7[b] | P | R[1] | 11.5 |

[a]Polyester and rubber copolymer made prior to compounding with polyphenylene ether.
[b]Polyphenylene ether and rubber functionalized simultaneously.
[c]P = polyphenylene ether functionalized with 1.5% orthoester,
p = unfunctionalized polyphenylene ether.
[d]R = EPDM functionalized with 1.0% orthoester; R[1] = EPDM functionalized with 1.5% orthoester, R* = EPDM functionalized with 2.0% orthoester; r = unfunctionalized EPDM; S = commercially available butadiene/acrylate based core shell impact modifier.
[e]Notched Izod in accordance with ASTM standards.

What is claimed is:

1. A process for making polyphenylene ether blends comprising the step of compounding:

(a) functionalized polyphenylene ethers;

(b) orthoester or orthocarbonate functionalized rubbers; and (c) polyesters.

2. A process in accordance with claim 1 wherein said functionalized polyphenylene ethers are orthoester or orthocarbonate functionalized polyphenylene ethers.

3. A process in accordance with claim 1 wherein said orthoester or orthocarbonate functionalized rubbers are orthoester or orthocarbonate functionalized EPDM.

4. A process in accordance with claim 1 wherein said polyesters are poly(1,4-butylene terephthalate).

5. A process for making polyphenylene ether blends comprising the step of compounding:

(a) functionalized polyphenylene ethers; and (b) mixtures comprising polyesters, orthoester or orthocarbonate functionalized rubbers and copolymers prepared therefrom.

6. A process in accordance with claim 5 wherein said functionalized polyphenylene ethers are orthoester or orthocarbonate functionalized polyphenylene ethers.

7. A process in accordance with claim 5 wherein said functionalized rubbers are orthoester or orthocarbonate functionalized EPDM.

8. A process in accordance with claim 5 wherein said polyesters are poly(1,4-butylene terephthalate).

9. A process for making polyphenylene ether blends comprising the steps of:
   (a) simultaneously functionalizing polyphenylene ethers and rubbers; and
   (b) compounding resulting reaction products in (a) with polyesters.

10. A process in accordance with claim 9 wherein said functionalized polyphenylene ethers are orthoester or orthocarbonate functionalized polyphenylene ethers.

11. A process in accordance with claim 9 wherein said functionalized rubbers are orthoester or orthocarbonate functionalized EPDM.

12. A process in accordance with claim 9 wherein said polyesters are poly(1,4-butylene terephthalate).

13. A polyphenylene ether blend composition comprising the reaction product of:
   (a) functionalized polyphenylene ethers; and
   (b) at least one group selected from the groups consisting of:
      (i) polyesters and orthoester or orthocarbonate functionalized rubbers, and
      (ii) mixtures comprising polyesters, orthoester or orthocarbonate functionalized rubbers and copolymers prepared therefrom.

14. A polyphenylene ether blend composition in accordance with claim 13 wherein said functionalized polyphenylene ethers are orthoester or orthocarbonate functionalized polyphenylene ethers and said orthoester or orthocarbonate functionalized rubbers are orthoester or orthocarbonate functionalized EPDM.

15. A polyphenylene ether blend composition in accordance with claim 13 wherein said polyesters are poly(1,4-butylene terephthalate).

16. A polyphenylene ether blend composition in accordance with claim 14 wherein said orthester and orthocarbonate functionalized polyphenylene ethers and EPDM have functional moieties represented by structural units having the formula

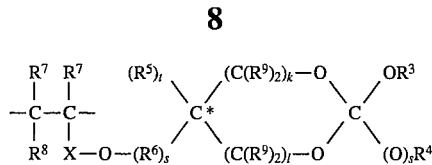

wherein $R^3$ is a $C_{1-10}$ primary or secondary alkyl or aralkyl or an aromatic radical or an alkylene radical forming a second 4 to 8 membered ring with $C^*$ thus producing a bicyclo compound;

$R^4$ is a $C_{1-10}$ primary or secondary alkyl or aralkyl or a $C_{6-10}$ aromatic radical or $R^3$ and $R^4$ taken together with atoms connecting them can form a 4 to 8 membered ring thus producing a spirocyclo compound;

$R^5$ is a hydrogen, alkyl or aryl;

$R^6$ is a $C_{1-6}$ alkylene radical;

k is an integer from 0 to 2 and I is an integer from 0 to 1;

s is 0 or 1;

t is 0 when $R^3$ and $C^*$ form a bicyclo compound and is otherwise 1;

each $R^7$ is individually a hydrogen or methyl;

$R^8$ is hydrogen, $C_{1-6}$ alkyl group or a $C_{6-10}$ aromatic radical;

each $R^9$ is independently a hydrogen, $C_{1-5}$ hydrocarbon, substituted or unsubstituted aromatic radical or a halogen; and X is a substantially inert linking group such as substituted or unsubstituted divalent aliphatic, alicyclic or aromatic radicals, wherein the radicals may be attached to other divalent radicals like carbonyl, sulfone and carbamoyl radicals.

17. A polyphenylene ether blend composition in accordance with claim 13 wherein said composition comprises a polyester matrix and polyphenylene ethers and functionalized rubbers dispersed only in said polyester matrix and not each other, and said functionalized rubbers are less than about 30 microns in size.

* * * * *